Sept. 7, 1926.  W. L. WRIGHT  1,598,951
PACKAGED HARDENED ICE CREAM AND THE PREPARATION THEREOF
Filed July 3, 1922
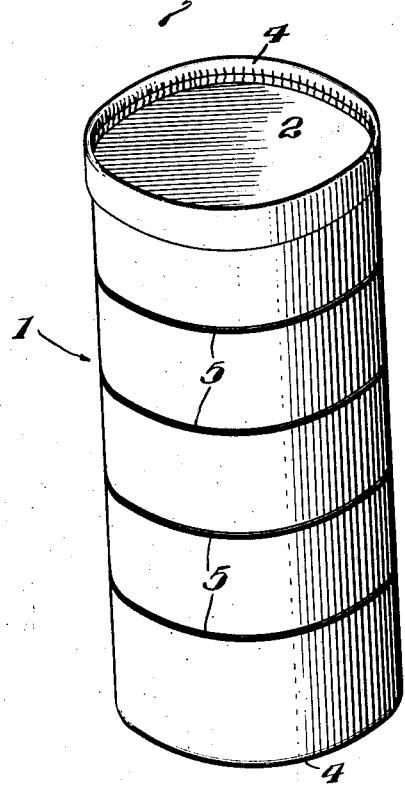
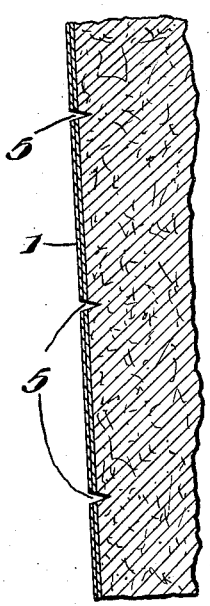
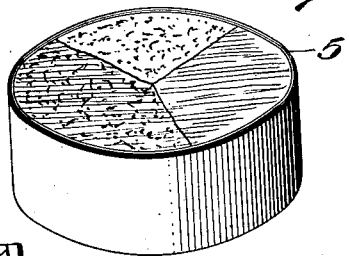
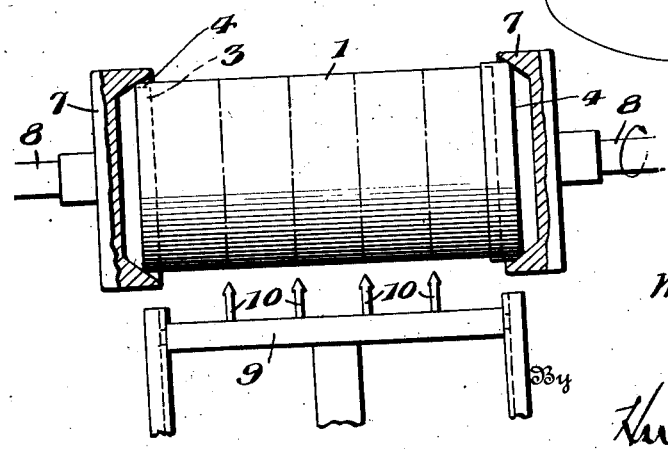
Inventor
Wilbur L. Wright,
By
Attorney Patented Sept. 7, 1926.

1,598,951

UNITED STATES PATENT OFFICE.

WILBUR L. WRIGHT, OF FULTON, NEW YORK, ASSIGNOR TO OSWEGO FALLS CORPORATION, OF FULTON, NEW YORK, A CORPORATION OF NEW YORK.

PACKAGED-HARDENED ICE CREAM AND THE PREPARATION THEREOF.

Application filed July 3, 1922. Serial No. 572,614.

This invention relates to packaged hardened ice cream and the preparation thereof for serving, and the objects and nature of the invention will be readily understood by those skilled in the art in the light of the following explanation of the accompanying drawings illustrating what I now believe to be the preferred mechanical expression or embodiment of my invention and of mechanical means that can be employed, from among others, in the practice of my method.

An object of the invention is to facilitate the separation of ice cream frozen hard in cylindrical paper cans, into slices or portions for serving, without the necessity of first removing the hard ice cream roll from the paper can.

With this and other objects in view, my invention consists in the article and in the method of producing such article as more fully set forth and specified hereinafter.

Referring to the accompanying drawings:—

Fig. 1 shows a package of hard frozen ice cream, according to my present invention.

Fig. 2, diagrammatically illustrates apparatus that can be utilized in carrying out my method for the production of the article of Fig. 1.

Fig. 3 shows a slice or portion cut from the article of Fig. 1.

Fig. 4 shows one of the sections after it has been detached from the package

By the use of certain machinery, cylindrical paper cans of commerce, are filled with semi frozen ice cream approximately as drawn from the freezers. The cream is arranged in these cans to produce a solid color of one flavor, or a roll of ice cream with a fancy center, or a roll made up of two or more longitudinal columns of different colors or flavors. These cylindrical cans after being filled with ice cream, are closed by the application of suitable closures to their open upper ends, and the filled closed paper cans are then placed in the refrigerating or so-called hardening room. The filled cans in said room are subjected to a very low temperature and the ice cream is thereby frozen hard to the condition required for the market. The cans of hard frozen ice cream remain in this room indefinitely, that is, they are removed for delivery to customers as required. The paper cans usually consist of a cylindrical barrel of several overlying plies of spirally wound secured layers of paper, a permanent end closure, and a slip cover for the open end of the barrel. The ice cream when hardened in such cans, freezes to the paper walls and forms a hard solid roll or cylindrical body enclosed within and frozen hard to the paper walls. The ice cream is thus frozen hard usually in paper cans of pint and quart sizes, generally in quart size cans. To serve a quart of ice cream in the form of a hard cylindrical roll, the roll must be cut into individual portions or slices, say into six, seven or eight equal slices, more or less.

It is general practice, to deliver these cans of hard frozen ice cream to the ultimate consumer, and for the consumer to remove the hard frozen roll of cream from the can which is usually a more or less mussy and difficult operation, and then slice the roll into portions. This practice is not satisfactory to the manufacturer, the dealer or the consumer, and by the time the roll has been removed from the can for cutting transversely, the exterior portion of the roll has usually become more or less liquefied, generally because of the method often followed to free the surface of the cream from the inner surfaces of the paper can.

According to my present invention, the paper cans of ice cream are frozen hard in the refrigerator or so-called hardening room as heretofore explained, but the ice cream manufacturer instead of sending out these imperforate closed cans of hard frozen material as heretofore, will by the use of suitable mechanical means, partially sever the package completely around or circumferentially into the number of slices or portions to be served by said package, and then deliver this partially severed package. It is then necessary for the consumer to merely complete the separation of the slices by a table knife when serving, and tear or remove from each slice the annular ring or paper surrounding the same, or the ice cream can be consumed without removing the paper annulus.

The ice cream manufacturer can utilize various mechanical means to thus partially sever the package as it comes from the refrigerator in a hard solid frozen condition, and before sending it out.

For instance, I prefer to employ for this purpose, means for rotating the hard frozen solid package around its longitudinal axis, and to partially sever the rotating package into uniform parallel disks by moving a row of spaced knives or cutters into contact with the circumference of the rotating package so that the knives will cut through the paper barrel of the can and, say a short distance radially into the hard solid frozen ice cream roll therein. This cutting or partially severing operation is performed when the package is taken from the hardening room preparatory to delivery so that the cutting operation is performed while the package is in its maximum condition of hardness and will reach the consumer in a good hard condition before sufficient time has elapsed to permit the ice cream to become more or less liquefied at the cuts. If so desired, the ice cream manufacturer, can complete the cuts completely through the hard ice cream roll and separate the same into any suitable number of slices and thus deliver the order in the desired number of separate slices or portions. The ice cream manufacturer can then wrap each slice separately in parchment or other paper, or can apply slip covers to each slice to enclose the same and fit on the annular paper rim surrounding each slice, all preparatory to delivering the order.

In the drawings, I show a hard frozen roll of ice cream within and frozen to a cylindrical paper can of commerce that embodies a cylindrical paper barrel 1 and end closures 2, 3, forming cylindrical exterior end flanges 4. This package after being prepared for the market in accordance with my method, presents a series of annular or circumferential cuts 5 completely through the paper barrel and extending into the hard ice cream roll therein and frozen thereto, and thereby severing said barrel into a series of separate annular paper rings frozen to and held in place by the hard ice cream roll that is surrounded thereby. The package thus formed, can then be separated into individual portions, by inserting the edge of a table or other knife blade successively into the cuts 5 and applying pressure thereto to complete the transverse severing of the ice cream roll in the planes of the initial annular cuts 5.

In the drawings, I show mechanism for severing the paper barrel of the hard frozen package to simultaneously form all of the cuts 5. For instance, this mechanism provides means for grasping and rapidly rotating the roll through the medium of rotary end chucks 7. One or both of these chucks is or are driven, and one or both of the chucks is or are movable longitudinally so that the frozen cylindrical package can be grasped and released. The chucks rotate on alined hubs or shafts 8 and are formed at their adjoining faces to take over the projecting annular end flanges of the paper can to grasp the can and rotate the same very rapidly on a fixed axial line alined with the longitudinal axis of the can.

Any suitable movable cutter bar 9 is provided parallel with the longitudinal axis of the can and carrying a longitudinal series of normally fixed blades or knives 10 preferably spaced uniform distances apart and arranged to simultaneously form all of the cuts 5 of the desired depth radially in the can, when the cutter bar is pressed toward the rotating can so that the knives 10 simultaneously bear against the barrel thereof. The number of cuts and spacing thereof is determined by the number of knives 10 and the spacing thereof, according to the number of servings or portions to be supplied by the particular ice cream package.

What I claim is:—

1. As a new article of manufacture, a hard frozen package of ice cream consisting of a cylindrical paper can and a roll of ice cream frozen hard therein, the paper barrel of the can composed of a longitudinal series of separated annular bands spaced by annular cuts extending into the ice cream roll, said separate annular paper bands held in place by the ice cream roll and frozen thereto.

2. A closed cylindrical paper can of hard frozen ice cream having a longitudinal series of circumferential cuts extending completely through the cylindrical wall of the can and defining the individual portions into which the hard frozen ice cream is to be sliced.

3. In the method of preparing hard frozen cylindrical paper cans of ice cream for later slicing into individual portions, that step which consists in forming a longitudinal series of spaced circumferential cuts completely severing the wall of the can and defining the individual portions into which the hard ice cream roll is to be thereafter sliced.

4. In the method of preparing a roll of ice cream frozen hard in a paper can for transversely slicing into flat disks each surrounded by paper rims, that step which consists in circumferentially separating the paper barrel of the can into a longitudinal series of separate paper rings held together by the hard frozen ice cream roll surrounded thereby.

5. In the method of preparing hard frozen cylindrical paper cans of ice cream for future slicing of the same into individual disks without first removing the hard ice cream roll from the can, that step which consists in rotating the can of frozen cream and cutting the rotating can to form therein a longitudinal series of spaced separate circumferential slits.

6. In the method of preparing a hard frozen cylindrical paper can of ice cream for slicing transversely into individual disks, that step which consists in simultaneously slitting the paper barrel of the can completely through along a multiplicity of parallel spaced circumferential lines while said can of frozen ice cream is rapidly rotated.

Signed at Fulton, N. Y., this 30th day of June, 1922.

WILBUR L. WRIGHT.